United States Patent
Abusamra

[11] Patent Number: 5,896,842
[45] Date of Patent: Apr. 27, 1999

[54] CLOSED-LOOP IGNITION TIMING CONTROL

[75] Inventor: Gary Charles Abusamra, Grand Blanc, Mich.

[73] Assignee: General Motors Corporation, Detroit, Mich.

[21] Appl. No.: 08/869,718

[22] Filed: Jun. 5, 1997

[51] Int. Cl.$^6$ .................................................. F02P 5/15
[52] U.S. Cl. ............................................. 123/425; 73/35.08
[58] Field of Search .................................. 123/425, 435; 73/35.08; 701/111

[56] References Cited

U.S. PATENT DOCUMENTS

| | | | |
|---|---|---|---|
| 4,391,248 | 7/1983 | Latsch | 123/425 |
| 4,417,556 | 11/1983 | Latsch | 123/425 |
| 4,444,172 | 4/1984 | Sellmaier et al. | 123/425 |
| 4,491,110 | 1/1985 | Bone et al. | 123/425 |
| 5,287,836 | 2/1994 | Shimasaki et al. | 123/425 X |
| 5,425,339 | 6/1995 | Fukui | 123/425 X |
| 5,676,113 | 10/1997 | Johansson et al. | 123/425 |

*Primary Examiner*—Tony M. Argenbright
*Attorney, Agent, or Firm*—Michael J. Bridges

[57] ABSTRACT

Internal combustion engine ignition timing control for timing combustion events of an air-fuel mixture in engine cylinders in response to cylinder mean effective pressure feedback information. Cylinder mean effective pressure information is provided through monitoring of variation in ion content in cylinder combustion plasma through ionization current variation measurement and integration. Ion content variation monitoring is carried out at varying ignition timing angles and ignition timing is driven toward timing associated with a minimum ion content variation corresponding to a preferred ignition timing associated with maximum combustion efficiency.

10 Claims, 4 Drawing Sheets

CLOSED-LOOP IGNITION TIMING CONTROL

TECHNICAL FIELD

This invention relates to automotive internal combustion engine control and, more particularly, to closed-loop control of the timing of engine cylinder ignition events.

BACKGROUND OF THE INVENTION

Conventional automotive ignition timing control normally operates in an "open-loop" control mode in which ignition timing is determined through application of engine parameter information to an ignition timing schedule that is determined under calibration conditions. Such open loop control necessarily but erroneously assumes that engine operating conditions will not deviate significantly from the calibration conditions. Any variation in conditions away from those calibration conditions can result in ignition timing error and reduced engine performance. Knock sensors are known to provide some feedback information indicating engine performance that can be used, in extreme conditions, to limit ignition timing. However, unless a knock condition is detected by the knock sensor, open-loop control and its associated shortcomings will dictate engine cylinder ignition timing.

The ionization tendency of cylinder combustion gases has been exploited to diagnose cylinder knock conditions and cylinder misfire conditions. The ion content in the cylinder combustion plasma is known to indicate the character of a cylinder combustion event. Generally, the ion content is measured by applying a supplemental voltage across the electrodes of a spark plug during a cylinder combustion event to measure the current carrying capacity of the plasma to which the electrodes are exposed. The magnitude of the voltage waveform across the electrodes may then be analyzed to determine the quality of the combustion event, so that a misfire condition or a knock condition, for example, may be indicated.

Figures 1, 2:
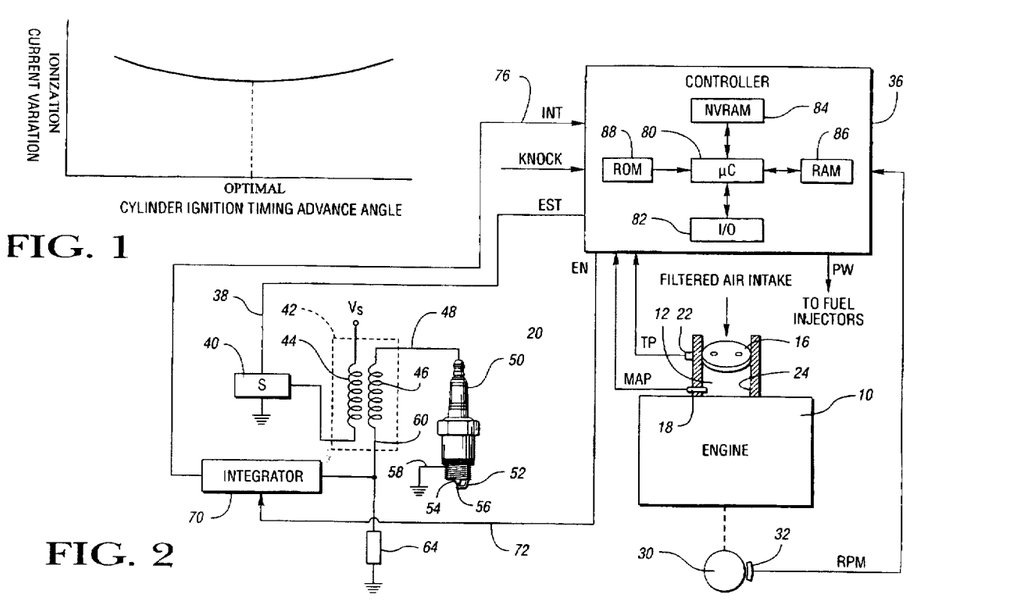
FIG. 1 is a graphical diagram illustrating a representative relationship between variation in ionization current and cylinder ignition timing.
FIG. 2 is a general diagram of the closed-loop ignition timing control hardware of the preferred embodiment of this invention.

The ionization current across the spark plug electrodes during a cylinder combustion event is proportional to cylinder mean effective pressure (MEP). Variation in MEP, and therefore variation in the ionization current has been determined to be at a minimum at an optimum ignition timing advance angle of a cylinder, as illustrated in FIG. 1. It would be desirable to apply ionization current information for ignition timing control to drive an open-loop ignition timing command toward an optimum ignition timing advance angle. However, ionization current is sensitive to a variety of conditions in addition to MEP, including fuel composition and temperature. The magnitude of ionization current, as is currently applied in knock or misfire diagnostics, is therefore poorly suited to direct application in engine ignition timing control.

It would be desirable to provide for a more comprehensive closed-loop ignition timing control than conventional knock-based ignition timing limiting. It would further be desirable to exploit cylinder ionization current information to determine optimum ignition timing advance angle of a cylinder. It would still further be desirable to control ignition timing on-line in response to such determined optimum ignition timing advance angle.

SUMMARY OF THE INVENTION

The present invention is directed to closed-loop ignition timing control for internal combustion engine cylinders in which ionization current variation is measured and ignition timing controlled in response thereto.

More specifically, variation in ionization current within a cylinder during a cylinder combustion event is measured at various ignition timing angles. Ignition timing angles corresponding to relatively high ionization current variation are identified and an ignition timing offset is updated to drive ignition timing away from such ignition timing angles and toward ignition timing angles corresponding to relatively low ionization current variation to move ignition timing toward an optimal ignition timing for improved combustion efficiency and increased engine performance.

In accord with a further aspect of this invention, under open-loop operating conditions in which ignition timing is substantially stable, a small ignition timing offset is applied to slightly vary ignition timing. Variation in ionization current is monitored at various ignition timing angles. A closed-loop ignition timing offset, which is combined with an open-loop ignition timing command, is periodically updated to drive ignition timing away from ignition timing angles exhibiting high ionization current variation and toward ignition timing angles exhibiting low ionization current variation. In accord with a further aspect of this invention, the small ignition timing offset takes the form of a square wave applied to the open-loop ignition timing command to move a base ignition timing between a first and a second timing value. The closed-loop ignition timing offset is then updated to drive the base ignition timing toward the one of the first and second ignition timing values corresponding to a lower variation in ionization current.

In accord with a further aspect of this invention, closed-loop ignition timing control operations responsive to ionization current variation cooperate with cylinder knock-based closed-loop ignition timing control to provide for comprehensive closed-loop ignition timing control. Ignition timing compensation will be activated in response to a detection of a knock condition, and closed-loop ignition timing control responsive to ionization current measurement will be activated when compensation of the detected knock condition is complete.

BRIEF DESCRIPTION OF THE DRAWINGS

The invention may be best understood by reference to the preferred embodiment and to the drawings in which.

DESCRIPTION OF THE PREFERRED EMBODIMENT

Referring to FIG. 2, internal combustion engine 10 receives filtered intake air through an intake air bore 24 into an intake manifold 12. An intake air valve 16 of the butterfly or rotary type is rotatably secured with the bore 24 with the rotational orientation of the valve 16 varied to vary a degree of restriction to passage of the filtered intake air thereby into the intake manifold 12. The rotational orientation of the valve 16 may be controlled manually by an engine operator in any conventional manner or may be controlled electronically through generation and delivery of an electronic control command to a valve control actuator (not shown) which is mechanically linked to the valve 16. A rotary potentiometer 22 or other conventional rotary position transducer is mechanically linked to the valve 16 to transduce the rotational orientation of the valve 16 into output signal TP. A conventional pressure transducer 18 is positioned within the intake manifold 12 to transduce the absolute air pressure therein into output signal MAP.

The filtered intake air is combined with an injected fuel quantity to form an air-fuel mixture which is delivered to an active cylinder (not shown) of the engine 10 during an intake event of that cylinder. The air-fuel mixture is ignited through a timed ignition arc across the spaced electrodes 52 and 54 of a conventional spark plug 50, which electrodes extend into the active cylinder. The ignition of the air-fuel mixture is termed a combustion event. The ignition of the air-fuel mixture drives a piston (not shown) within the cylinder to rotate an engine output shaft 30, such as a crankshaft, to drive driven vehicle wheels (not shown) through a conventional drive assembly (not shown). A sensor 32 of the variable reluctance or Hall effect type is positioned in proximity to the output shaft 30 to transduce passage of a plurality of spaced teeth or notches (not shown) about the circumference of the shaft 30 into an output signal RPM. The frequency of the signal RPM is proportional to engine rotational speed (engine speed) and the individual cycles of the signal RPM indicate specific engine cylinder events. For example, the teeth or notches (not shown) and the sensor 32 may be positioned such that a predetermined engine cylinder event, such as a top dead center event, may be detected when the signal RPM crosses a predetermined voltage reference.

Spark plug drive circuitry may be provided in any suitable conventional form and, in this embodiment, takes the form of a primary ignition coil 44 matched with secondary ignition coil 46 to form transformer 42, with a low voltage terminal of the primary ignition coil 44 electrically attached to a conventional ignition switch S 40 responsive to an ignition control signal EST applied to the switch S 40 on line 38. The low voltage terminal of secondary ignition coil 46 is connected to a ground reference through series current sense resistor 64 via line 60. A hardware integrator 70 of any suitable conventional type is electrically coupled to line 60 to receive as its input signal the signal on the low voltage terminal of the secondary ignition coil 46 representing the ionization current across the spark plug gap 56. A control line 72 is applied to the integrator 70 carrying signal EN which, when set to an active signal level, clears the integrator output value and starts a process of integrating the integrator input signal on line 60. The integrator output signal INT is applied as an input signal to a conventional controller 36 which takes the form of a single-chip microcontroller in this embodiment, including such conventionally-known elements as a microcontroller device μC 80 for carrying out control, logic, and arithmetic operations, a read only memory device ROM 88 for non-volatile storage of data or program instructions, a random access memory device RAM 86 for volatile data storage and retrieval, a non-volatile memory device NVRAM 84 for non-volatile data storage and retrieval, and an input/output device I/O 82 for outputting communication information and for receiving and processing controller input signal information. The inventor intends that the ionization current sensing may be provided in an alternative embodiment within the scope of this invention on the high voltage side of the secondary ignition coil 46 by transducing current passing through line 48 into an output signal, via any suitable conventional current sensing approach, and by applying the output signal to the integrator 70 for application as input INT to the controller 36 through the exercise of ordinary skill in the art.

The controller 36 receives an input signal KNOCK representing a sensed cylinder knock intensity corresponding to an active engine cylinder. KNOCK may take the form of a count of knock events indicating knock intensity for an active engine cylinder. The controller 36, when activated by an engine operator, references a sequence of control instructions from ROM 88 and executes such instructions in a step by step manner to provide for engine control, diagnostic, and maintenance operations. Such operations include operations to generate and output a fuel control signal PW in the form of a pulse width having an on-time during which pressurized fuel is delivered by one or more fuel injectors of a conventional type to engine cylinders (not shown) or to engine cylinder intake runners (not shown), operations to generate and output an ignition timing control signal EST followed by a measurement pulse signal, and closed-loop ignition timing control operations, as will be described.

Figure 3A:
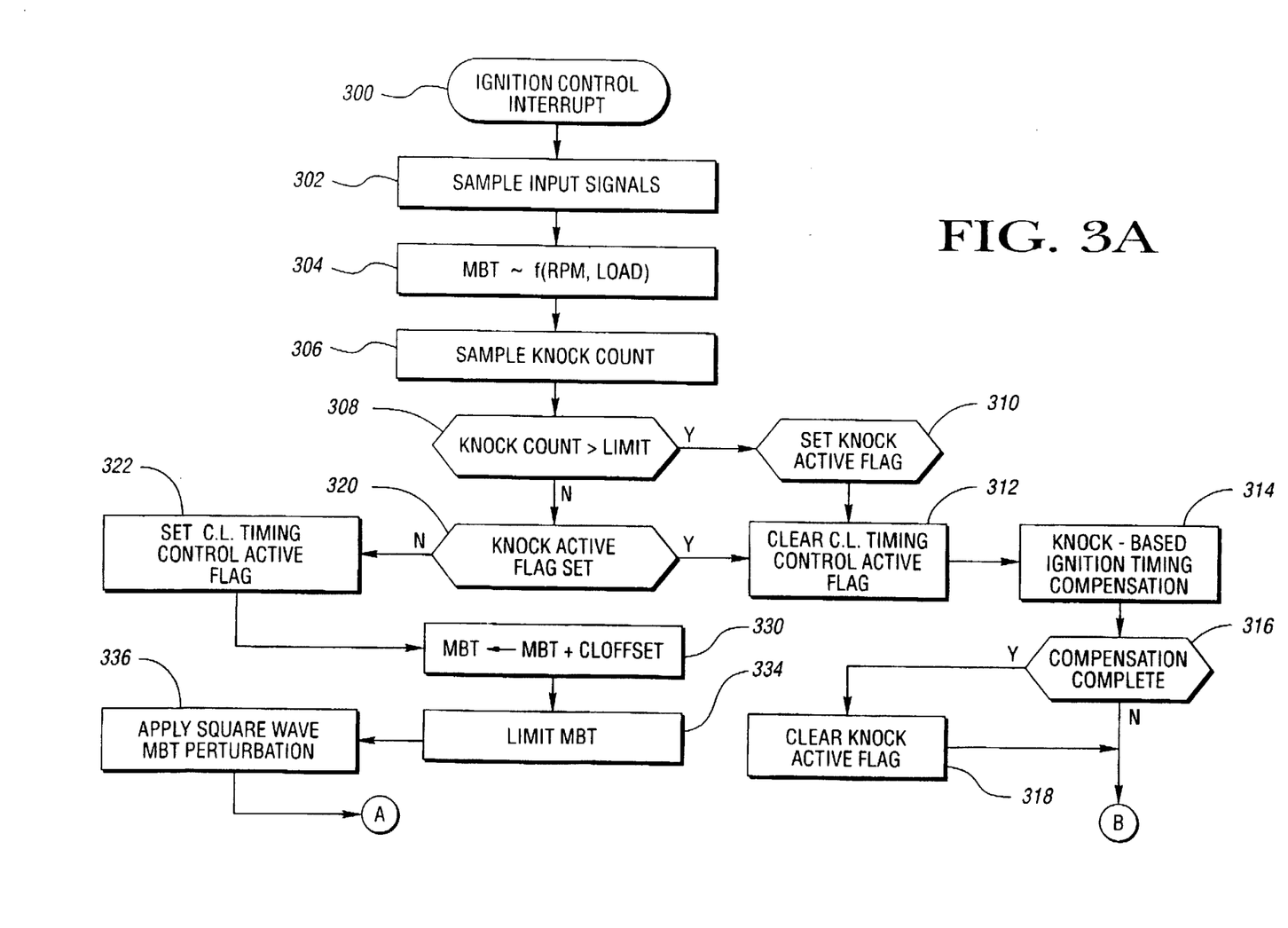
FIGS. 3A, 3B, and 4 are flow diagrams illustrating a flow of operations of the hardware of FIG. 2 for closed-loop ignition timing control.
Figure 3B:
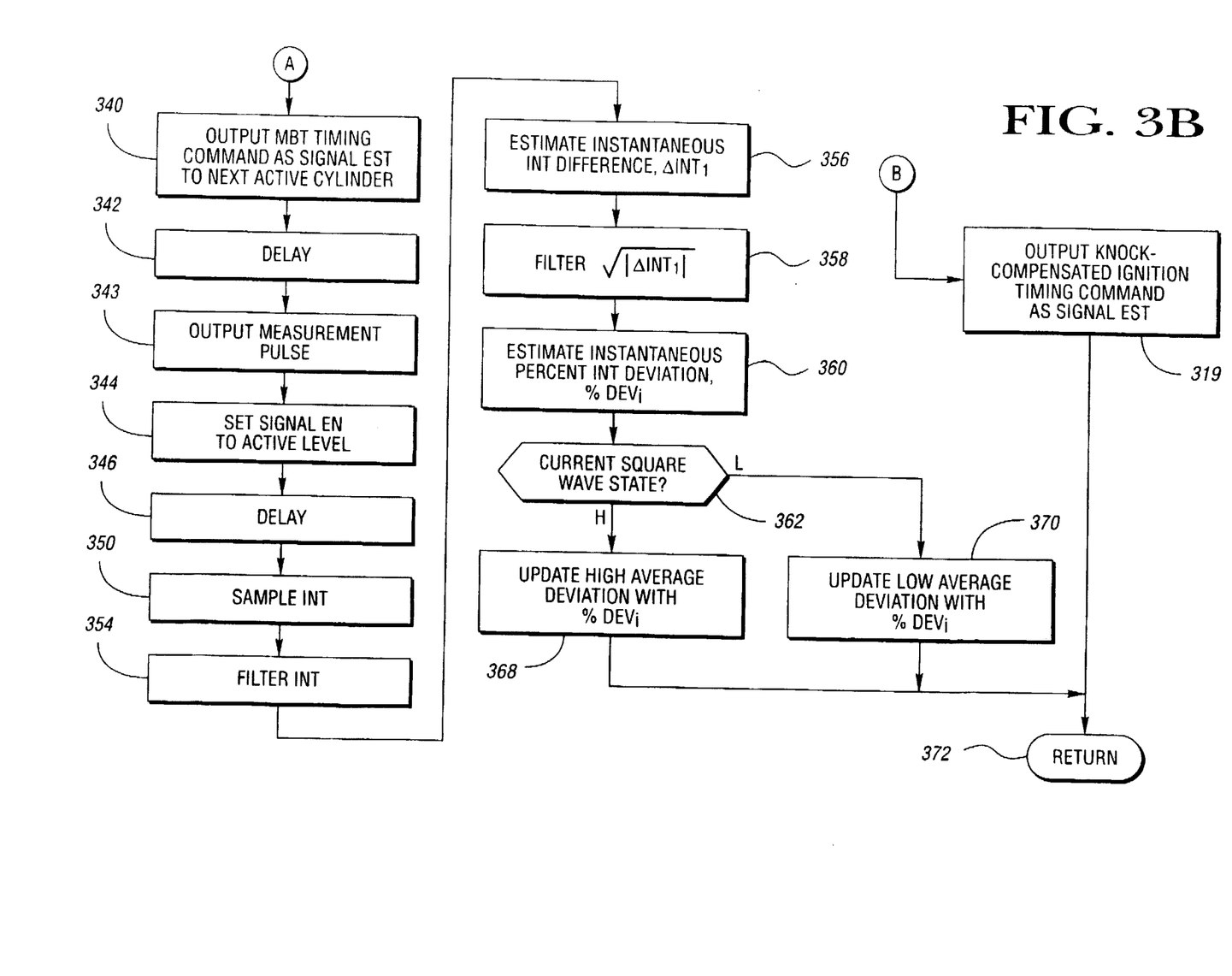
Figure 4:
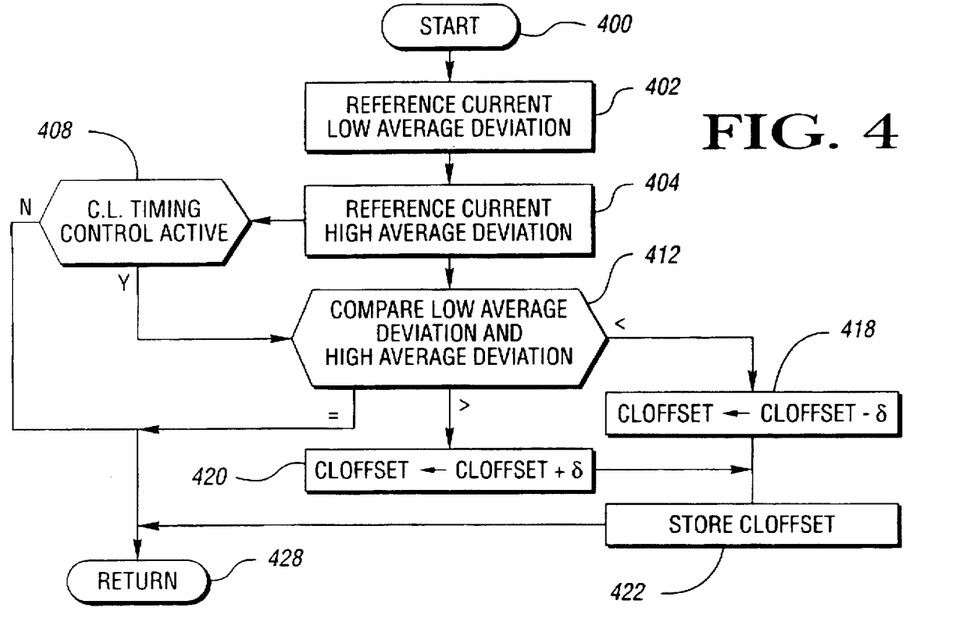

The sequence of control operations referenced from ROM 88 and executed by the microcontroller 80 include the closed-loop ignition control operations illustrated in a step by step manner through FIGS. 3A, 3B, and 4. The operations of FIGS. 3A and 3B are repeatedly executed while ignition power is applied to the controller 36 of FIG. 2 following ignition control interrupts. In this embodiment, an ignition control interrupt is generated prior to each cylinder combustion event, and is serviced by carrying out the operations of FIGS. 3A and 3B. The operations of FIG. 4 are carried out periodically while ignition power is applied to the controller 36 (FIG. 2) such as about every fifteen milliseconds to update an ignition timing offset to incorporate closed-loop compensation information therein, as will be described.

Returning to FIGS. 3A and 3B, upon each occurrence of an ignition control interrupt, the operations of FIG. 3A are initiated beginning at a step 300. Ignition control interrupts are generated in this embodiment when the engine rotates through predetermined operating angles within an engine cycle, such as operating angles corresponding to engine cylinder top dead center positions. The operations of FIGS. 3A and 3B generate and output an ignition timing control command including both open-loop and closed-loop components and receive, process and record ionization current variation information for use in closed-loop ignition timing compensation in accordance with this invention.

Following the initial step 300, input signals indicating the current state of engine parameters, including signal RPM indicating current engine speed, signal MAP indicating intake manifold 12 absolute air pressure, and signal TP indicating current angular orientation of the intake air valve 16 (FIG. 2) are sampled at a next step 302. An open-loop ignition timing command, such as the generally-known minimum ignition timing advance angle for best torque (MBT) command is next referenced at a step 304 from a stored open-loop schedule of commands as a function of engine operating conditions, such as may be indicated by current engine speed and load. The entries of such open-loop command schedule are determined through a conventional calibration procedure as a desired minimum ignition timing for best torque under calibration conditions, as is generally understood in the art. Engine speed may be indicated by the sampled value of the input signal RPM and engine load may be indicated through a combination of such generally known input signals as TP and MAP (FIG. 2), or directly from any suitable conventional mass airflow sensor (not shown) for transducing mass airflow rate into the engine into a signal that may be sampled at the step 302.

A knock count is next sampled from the input signal KNOCK at a next step 306, indicating the intensity of any recent knock activity in the current active cylinder. As described, the knock count may be generated in any suitable conventional manner indicating cylinder knock intensity. If the knock count exceeds a calibrated knock count limit, as determined at a next step 308, a knock active flag is next set at a step 310 indicating closed-loop ignition timing compensation responsive to a sensed significant knock condition is active, and a closed-loop (C.L.) timing control active flag is next cleared at a step 312.

Returning to step 308, if the knock count does not exceed the knock limit, the knock active flag is examined at a next step 320. If the knock active flag is determined to be set at the step 320, knock-based closed-loop ignition timing control operations are currently active and the C.L. timing control active flag is next cleared at the step 312. Following the step 312, knock-based ignition timing compensation is next carried out in any conventional manner at a next step 314, for example by retarding ignition timing by a pre-set angle for a number of ignition events of the knocking cylinder, and then gradually advancing the ignition timing of that cylinder back to a base ignition timing, such as the open-loop ignition timing, as is generally-known in the art.

Following the step 314, a determination is made at a next step 316 as to whether such knock-based ignition timing compensation is complete. If the compensation is complete, the knock active flag is cleared at a next step 318. Next, or if the knock-based compensation is determined at the step 316 to not be complete, the knock-compensation ignition timing command is next output as the ignition timing command EST for the next active engine cylinder at a step 319 in any suitable conventional manner, such as by driving signal EST to a high signal level a pre-set engine operating angle prior to the compensation ignition timing command, and then returning signal EST to a low signal level at the time dictated by the compensated ignition timing command generated through the operations of steps 304 and 314.

While the signal EST is at a high signal level, the primary ignition coil 44 (FIG. 2) will be charging up and when the signal EST returns to a low signal level, current through the primary ignition coil will be interrupted, inducing a surge of ignition drive current through the secondary ignition coil 46 (FIG. 2) and across the spark plug gap 56 between the electrodes 54 and 52 of FIG. 2 for igniting the air fuel mixture in the active engine cylinder. The closed-loop ignition timing provided through knock condition responsive ignition timing compensation of steps 314 and 319 is not augmented by ionization current-responsive closed-loop ignition timing compensation in this embodiment. Accordingly, upon issuing the ignition timing command at the step 319, the ignition timing control operations of FIG. 3A are complete, and the controller 36 (FIG. 2) returns, via a next step 372, to carry out any other ongoing control or diagnostics operations that may be included in accordance with general ignition timing control practice.

Returning to step 320, if the knock active flag is determined to not be set, then knock-based closed-loop ignition timing control operations are not currently active in closed-loop ignition timing compensation. Accordingly, ionization current-based closed loop ignition timing control operations are then activated for driving ignition timing toward an optimum timing based not on open-loop control and corresponding assumptions about consistency between current conditions and calibration conditions, but rather based on measurement of actual ignition timing performance. It should be pointed out that the inventor intends that open-loop ignition timing be substantially stable for closed-loop ignition timing control operations responsive to ionization current variation to be active, to help isolate the cause of an detected change in ionization current, as will be further described. Open-loop ignition timing is substantially stable in this embodiment if the MBT value referenced at the step 304 is substantially constant.

Figure 5A:
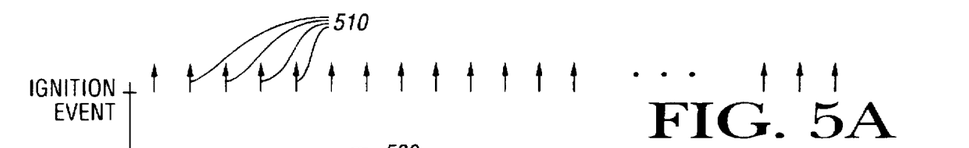
FIG. 5A–5F are signal timing diagrams illustrating ignition timing control signals generated through operation of the hardware of FIG. 2.
Figure 5B:
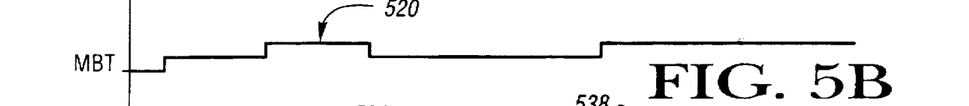
Figure 5C:
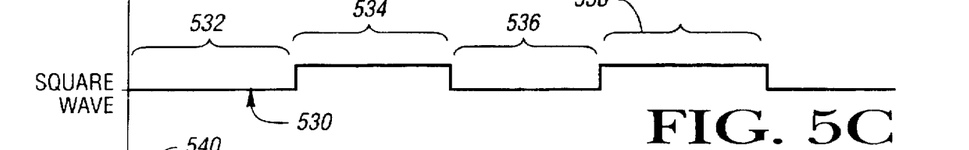

Returning to FIG. 3A, closed-loop ignition control operations are initiated by proceeding from the step 320 to a next step 322 to set a closed-loop (C.L.) ignition timing control active flag, and then to update the MBT timing command determined at the step 304 by adding a current closed-loop timing offset CLOFFSET thereto at a next step 330. The updated MBT timing value is next limited at a next step 334 in accordance with any applicable timing limits that may be imposed through the exercise of ordinary skill in the art, for example so that established extreme timing limits are not exceeded. A square wave ignition timing perturbation, such as that illustrated in the pulsetrain 530 of FIG. 5C is next applied to the updated MBT ignition timing value at a step 336 to controllably vary the ignition timing so that a measure of ionization current variation at various ignition timing values may be determined in accordance with the principles of this invention. Generally, an open-loop ignition timing command will be adjusted to drive ignition timing toward any ignition timing value corresponding to a relatively low ionization current variation. Any schedule for varying ignition timing away from a base timing value may be applied at the step 336, including a schedule that includes more than two timing values. For any schedule applied at the step 336, the ionization current variation corresponding to each ignition timing value of the schedule will be monitored and actual ignition timing corrected to drive away from timing values having a relatively high ionization current variation toward timing values having a relatively low ionization current.

Figure 5D:
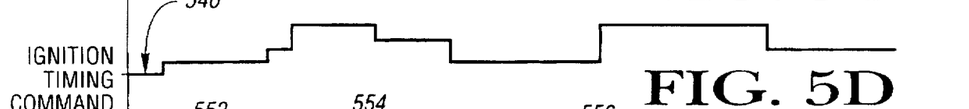

The square wave applied at the step 336 is a calibrated number of degrees of spark timing advance in this embodiment, such as one or two degrees of spark advance added to the open-loop timing determined at the steps 304 and 330 for a calibrated number of ignition events, such as five ignition events in this embodiment as illustrated by the portions 534 and 538 of pulsetrain 530 of FIG. 5C, after which it is reduced to zero degrees of spark advance, as illustrated by the portions 532 and 536 of the pulsetrain 530 of FIG. 5C. Accordingly, while the ionization current feedback-based closed-loop ignition timing control is active in this embodiment, a small timing offset will be added to the open-loop ignition timing every other block of about five ignition events at the step 336 of FIG. 3A. For example, if the open-loop ignition timing curve takes the form of the representative ignition timing curve 520 of FIG. 5B, then the addition of the timing offset at the step 336 will result in an ignition timing command corresponding to command curve 540 of FIG. 5D.

After applying the square wave to MBT timing at the step 336, the overall ignition timing command is output at a next step 340 in the form of a ignition timing command EST (FIG. 2) in any suitable conventional manner, such as that illustrated by the curve 540 of FIG. 5. At the rising edge of EST, ignition switch S 40 (FIG. 2) will initiate charging of the primary ignition coil 44 of transformer 42 (FIG. 2), and at the falling edge of EST, will interrupt current in the primary ignition coil 44, inducing a surge of current across the spark plug gap 56 (FIG. 2) for igniting the air-fuel mixture in the engine cylinder (not shown). Accordingly, the falling edge of signal EST is set up to occur at the engine angular position corresponding to the ignition timing determined through steps 304, 330, 334, and 336 and the rising edge is set up to occur a predetermined engine angular position prior to the falling edge so that the pulse width of the signals EST is sufficient to allow a desired charging of the primary ignition coil 44 (FIG. 2). FIG. 5A illustrates the timing of a series of ignition events 510 in an engine cylinder, corresponding to the falling edge of a series of EST signals applied for driving the spark plug of the cylinder, such as spark plug 50 of FIG. 2.

The current across the spark plug gap 56 (FIG. 2) during the combustion of the air-fuel mixture in the engine cylinder (not shown) indicates the content of current carrying ions in the plasma in proximity to the electrodes 52 and 54 within the cylinder, which may be applied to determine cylinder mean effective pressure and the quality of the combustion event. Cylinder pressure is the least sensitive to change in ignition timing variation at an optimum ignition timing advance angle. By measuring ionization current variation over varying ignition timing values, an optimum ignition timing advance may be determined in accord with this invention.

Specifically, after outputting signal EST to the ignition switch S 40 (FIG. 2), a delay is provided at a next step 342 for a period of time sufficient to normally allow for initiation of cylinder combustion. When the delay, which may be set to a calibratable fixed value or may vary as a function of engine speed (indicated by signal RPM), is complete, a measurement pulse is applied on line 38 (FIG. 2) to the ignition control circuitry of FIG. 2 at a next step 343. The measurement pulse is applied to induce a small voltage drop across the electrodes 52 and 54 of FIG. 2 so that a measure of ionization current between the electrodes may be made. The measurement pulse may have any suitable amplitude and duration, such as an amplitude and duration substantially smaller than that of the pulse EST, as is generally under in the art as required to ionization current measurement. The measurement pulse is issued by the controller 36 during the combustion event within the active engine cylinder (not shown) to allow analysis of ion content during combustion.

Figure 5E:
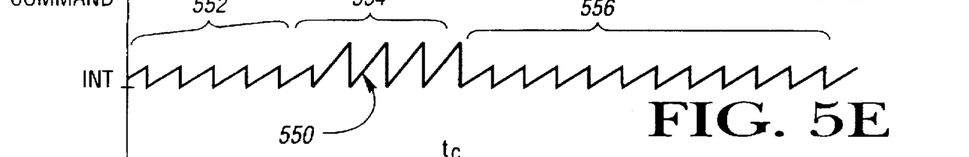
Figure 5F:
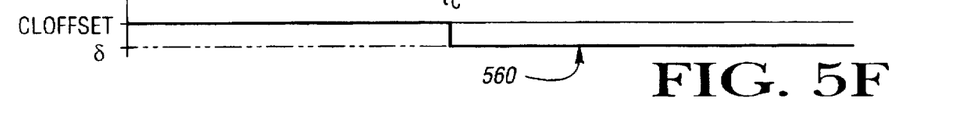

Following issuance of the measurement pulse at the step 343, signal EN is set to an active level at a next step 344 to clear the integrator 70 (FIG. 2) output and to initiate an integration period while a potential is applied, via the measurement pulse, across the spark plug electrodes 52 and 54. A delay is then executed at a next step 346 to allow integration of the ionization current over a calibrated integration period. A representative integrator 70 (FIG. 2) output signal INT pattern 550 is illustrated in FIG. 5E. When signal EN is set to an active level, INT is reset and integration of ionization current resumes, starting from a zero integrator output. The ionization current across the spark plug gap 56 dictates the time rate of change in the integrator output during a cylinder combustion event.

The magnitude of signal INT at the time it is sampled at a next step 350 following completion of the delay period of step 346 indicates the area under the curve of the ionization current of line 60 of FIG. 1. Sampling of signal INT is carried out by the controller through its I/O device 82. The sampled INT value is next filtered through a lag filter process, which takes the form of an exponentially-weighted moving average filter process at a next step 354. An instantaneous INT sample difference, $\Delta INT_i$, is next determined at a step 356 as the difference between the filtered and unfiltered INT values. $\Delta INT_i$ is then further processed at a step 358 by filtering, such as through an exponentially-weighted moving average filter process, the square root of its absolute value to determine the mean absolute deviation in the INT sample. The instantaneous percent deviation in the INT sample %DEVi is next estimated at a step 360 as the quotient of the filtered INT sample determined at the step 354 divided by the mean absolute deviation in the INT sample. The instantaneous percent deviation %DEVi indicates ionization current variation at the current ignition advance angle. A relatively significant variation indicates operation away from the optimum ignition advance angle.

%DEVi values are stored for further analysis according to the state of the square wave applied at the step 336 when the values were generated. More specifically, if the current square wave state is "high," as determined at a next step 362, then the current %DEVi value is incorporated into a high average deviation value by applying it through a standard filter process, such as the exponentially-weighted moving average filter process, and storing the filter output as the high average deviation at a next step 368. The %DEVi values determined while the square wave is in its high state will be applied through the filter process at the step 368 to generate and store a representative high average deviation value. If the current square wave state is "low," as determined at the step 362, then a low average deviation value is updated by applying the current %DEVi value thereto at a next step 370 through a standard filter process, such as the exponentially-weighted moving average filter process, with the filter output being stored as the low average deviation. The %DEVi values determined while the square wave is in its low state will be applied through the filter process at the step 370 to generate and store in RAM 86 (FIG. 2) a representative low average deviation value. The high and low average deviation values are provided as an indication of the variation in ionization current in the plasma within an active engine cylinder at various ignition timing values. The variation in ionization current is applied to determine any ignition timing adjustment that may drive ignition timing to a more efficient value at which ionization current variation is minimized. After updating either the low or high average deviation value at steps 368 or 370, the described step 372 is executed to conclude the ignition control interrupt service operations of FIGS. 3A and 3B.

Referring to FIG. 4, a flow of controller 36 (FIG. 2) operations for updating the closed-loop ignition timing offset CLOFFSET in accordance with accumulated ionization current variation information are illustrated in a step-by-step manner for periodic execution by the controller 36, such as at about a fifteen millisecond rate while the controller is active (through manual energization by an operator, as described). A timer-based interrupt may be generated by the controller 36 (FIG. 2) in any conventional manner following a pre-set time period, such as about fifteen milliseconds. Upon occurrence of the interrupt, controller operations may be suspended and the operations of FIG. 4 executed, beginning at a step 400 and proceeding to reference the stored low average deviation value at a step 402 and to reference the stored high average deviation value at a step 404. If closed-loop ignition timing control is active, as indicated by the closed-loop timing control flag being set as determined at a next step 408, then the current low average deviation is next compared to the current high average deviation at a step 412. The relative magnitude of the low and high average deviation values indicates which is most sensitive to ignition timing change and accordingly which has a corresponding ignition timing value further away from an optimal ignition timing value. If the low average deviation is determined to exceed the high average deviation at the step 412, then the ignition timing offset CLOFFSET must be increased at a next step 420 by a calibrated timing increase δ, such as of about one degree in this embodiment. The increase in CLOFFSET will, when CLOFFSET is added to the MBT ignition timing value at the described step 330 of FIG. 3A, drive ignition timing toward the more stable ignition timing corresponding to the high average deviation.

Alternatively, if the high average deviation is determined to exceed the low average deviation at the step 412, then the ignition timing offset CLOFFSET must be decreased at a next step 418 by a calibrated timing decrease δ, such as about one degree in this embodiment. The calibrated timing decrease may vary from the calibrated timing increase applied at the step 420. The decrease in CLOFFSET provided at the step 418 will, when CLOFFSET is applied to MBT ignition timing at the described step 330 of FIG. 3A, drive ignition timing toward a more stable ignition timing corresponding to the low average deviation. Such is generally illustrated in curves 550 and 560 of respective FIGS. 5E and 5F. The magnitude of signal INT is significantly increased in portion 554 of curve 550 relative to portion 552, due to the application of the high portion 534 (FIG. 5C) of the pulsetrain 530 to the MBT timing value. The increase in ignition timing that lead to the INT increase in portion 554 of curve 550 is assumed to have resulted from a deviation in ignition timing away from an optimal timing value. Such an increase in signal INT will lead to the low average deviation being less than the high average deviation as determined at the step 412, and the CLOFFSET value will therefore be decreased by an amount δ, as illustrated in curve 560 (FIG. 5F), after which the INT value may be stabilized as illustrated in portion 556 of curve 550, or indeed may require further timing advance reduction, as will be indicated by further execution of the step 412 of FIG. 4 for or later sampled INT values. After the steps 418 and 420, the updated CLOFFSET value is stored in RAM 86 (FIG. 2) for application in the next iteration of the operations of FIGS. 3A and 3B and a step 428, to be described is then executed.

If the low and high average deviation values are determined to be substantially the same at the step 412, then neither of the corresponding ignition timing values exhibited a relatively high ionization current variation, and no closed-loop timing correction is provided by proceeding from the step 412 to a step 428 to conclude the operations of FIG. 4 by returning to resume execution of any operations that were suspended to allow for servicing of the timer interrupt through the operations of FIG. 4. Returning to step 408, if closed-loop ignition timing control is determined to not be active, CLOFFSET is not updated and operations of FIG. 4 are concluded by proceeding from the step 408 to the step 428.

It should be pointed out that the series of operations of FIGS. 3A, 3B, and 4 for analyzing variation in ionization current for application to drive ignition timing toward an optimal ignition timing value may be varied within the scope of this invention through the exercise or ordinary skill in the art. By varying ignition timing of an engine cylinder and then monitoring any resulting change in ionization current within the cylinder during a cylinder combustion event, one with ordinary skill in the art may readily determine a closed-loop ignition timing change to drive ignition timing toward an optimal ignition timing at which ionization current change is minimized in accordance with principles of this invention. The square wave may readily be modified to include more than two ignition timing changes and ionization current at the resultant increased number of ignition timing values monitored. CLOFFSET may then be modified in direction to drive ignition timing away from timing values corresponding to relatively large ionization current deviation and toward ignition timing values corresponding to relatively small ionization current deviation.

The preferred embodiment is not intended to limit or restrict the invention since many modifications may be made through the exercise of ordinary skill in the art without departing from the scope of the invention.

The embodiments of the invention in which a property or privilege is claimed are described as follows:

1. A closed-loop ignition timing control method for timing application of an ignition signal to a spark plug for igniting an air-fuel mixture in an engine cylinder during a cylinder combustion event, comprising the steps of:

referencing a base ignition timing command;

varying the base ignition timing command in accordance with an ignition timing variation value;

applying the ignition signal to the spark plug in accordance with the varied base ignition timing command to initiate a cylinder combustion event;

transducing cylinder combustion plasma ion content into an ion content output signal during the cylinder combustion event;

determining cylinder combustion plasma ion content variation as a function of the ion content output signal; and varying ignition timing in response to the determined cylinder combustion plasma ion content variation in direction to minimize the variation.

2. The method of claim 1, wherein the transducing step comprises the steps of:

sampling ionization current in the engine cylinder; and integrating the ionization current over an integration period to form the ion content output signal.

3. The method of claim 1, wherein the step of varying the base ignition timing command comprises the steps of:

referencing an ignition timing variation schedule; and varying the base ignition timing command in accordance with the referenced schedule.

4. The method of claim 3, wherein the referenced schedule includes a plurality of ignition timing variation values, wherein the step of varying the base ignition timing command varies the base ignition timing command in accordance with each of the plurality of ignition timing variation values, wherein the applying, transducing, and determining steps are applied for each varied base ignition timing command, the method further comprising the step of:

comparing the ion content variation corresponding to each of the varied base ignition timing commands; and wherein the step of varying ignition timing varies ignition timing in direction away from a varied base ignition timing command corresponding to a relatively large ion content variation and toward a varied base ignition timing command corresponding to a relatively small ion content variation.

5. The method of claim 1, wherein the spark plug has spaced electrodes within the engine cylinder and wherein the ion content output signal is an ionization current induced across the spaced electrodes.

6. The method of claim 1, further comprising the steps of:

diagnosing significant engine cylinder knock conditions; and limiting the base ignition timing command in accordance with a knock limit when significant engine cylinder knock conditions are diagnosed;

and wherein the step of varying ignition timing varies ignition timing in response to the determined cylinder combustion plasma ion content variation in direction to minimize the variation when significant engine cylinder knock conditions are not diagnosed.

7. An internal combustion engine ignition timing control method for controlling the timing of issuance of an ignition drive command for initiating combustion of an air-fuel mixture in an engine cylinder, comprising the steps of:

providing at least a first and second ignition timing command:

for each provided ignition timing command, (a) issuing the ignition drive command at the timing of the provided ignition timing command to initiate the combustion, (b) transducing ion content in the engine cylinder into an ion content signal following issuance of the ignition drive command, and (c) determining ion content variation in the engine cylinder as a function of the ion content signal;

identifying the relative magnitude of the ion content variation for the provided ignition timing commands;

adjusting a base ignition timing command away from a provided ignition timing command having a relatively high ion content variation and toward a provided ignition timing command having a relatively low ion content variation; and controlling ignition timing in accordance with the adjusted base ignition timing command.

8. The method of claim 7, wherein the providing step comprises the steps of:

referencing a base ignition timing value;

providing a first and second timing offset;

providing a first ignition timing command by combining the base ignition timing value with the first timing offset; and providing a second ignition timing command by combining the base ignition timing value with the second timing offset.

9. The method of claim 7, further comprising the step of diagnosing whether a significant knock condition is present in the engine cylinder, and wherein the adjusting step is carried out while a significant knock condition is not diagnosed as present in the engine cylinder.

10. The method of claim 9, further comprising the step of:

adjusting the base ignition timing command in accordance with a knock limit value when a significant knock condition is diagnosed as present within the engine cylinder.

* * * * *